United States Patent
Yerramalli et al.

(10) Patent No.: US 11,477,766 B2
(45) Date of Patent: Oct. 18, 2022

(54) UPLINK CONTROL INFORMATION REPORTING

(71) Applicant: QUALCOMM Incorporated, San Diego, CA (US)

(72) Inventors: Srinivas Yerramalli, San Diego, CA (US); Chirag Sureshbhai Patel, San Diego, CA (US); Tao Luo, San Diego, CA (US); Peter Gaal, San Diego, CA (US); Juan Montojo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 642 days.

(21) Appl. No.: 15/596,806

(22) Filed: May 16, 2017

(65) Prior Publication Data

US 2017/0347353 A1 Nov. 30, 2017

Related U.S. Application Data

(60) Provisional application No. 62/340,975, filed on May 24, 2016.

(51) Int. Cl.
*H04W 72/04* (2009.01)
*H04L 1/00* (2006.01)
(Continued)

(52) U.S. Cl.
CPC ....... *H04W 72/0413* (2013.01); *H04L 1/0031* (2013.01); *H04L 5/0053* (2013.01); *H04W 72/0446* (2013.01); *H04L 1/1671* (2013.01)

(58) Field of Classification Search
CPC .......... H04W 72/0413; H04W 72/0446; H04L 1/0031; H04L 1/1671; H04L 5/0053
See application file for complete search history.

(56) References Cited

U.S. PATENT DOCUMENTS

2011/0243191 A1* 10/2011 Nakao .................. H04B 1/7143
 375/133
2011/0268045 A1* 11/2011 Heo ....................... H04L 1/0029
 370/329
(Continued)

FOREIGN PATENT DOCUMENTS

CN 102484869 A 5/2012
CN 102823179 A 12/2012
(Continued)

OTHER PUBLICATIONS

International Search Report and Written Opinion—PCT/US2017/033037—ISA/EPO—dated Jul. 25, 2017.
(Continued)

*Primary Examiner* — Mansour Oveissi
(74) *Attorney, Agent, or Firm* — Patterson + Sheridan, LLP

(57) ABSTRACT

Certain aspects of the present disclosure relate to methods and apparatus for uplink control information (UCI) reporting. In certain aspects, a method includes receiving an indication of a number of symbols of a subframe available for uplink transmission. In certain aspects, the method further includes rate matching uplink control information (UCI) to the subframe based on the indication.

27 Claims, 14 Drawing Sheets

(51) Int. Cl.
*H04L 5/00* (2006.01)
*H04L 1/16* (2006.01)

(56) References Cited

U.S. PATENT DOCUMENTS

| | | | |
|---|---|---|---|
| 2011/0310759 A1* | 12/2011 | Gerstenberger | H04L 5/006 370/252 |
| 2013/0016687 A1 | 1/2013 | Yang et al. | |
| 2013/0343327 A1* | 12/2013 | Jang | H04J 13/22 370/329 |
| 2014/0140315 A1* | 5/2014 | Kim | H04W 56/0045 370/329 |
| 2014/0334390 A1* | 11/2014 | Lindholm | H04L 5/0053 370/329 |
| 2015/0289211 A1 | 10/2015 | Lee et al. | |
| 2016/0088625 A1 | 3/2016 | Kadous et al. | |
| 2017/0041921 A1* | 2/2017 | Oketani | H04W 76/10 |
| 2017/0289967 A1* | 10/2017 | Yu | H04L 5/0092 |
| 2018/0048429 A1* | 2/2018 | Takahashi | H04L 1/1812 |
| 2018/0184426 A1* | 6/2018 | Li | H04W 72/0413 |
| 2018/0220413 A1* | 8/2018 | Yang | H04L 5/001 |
| 2018/0332605 A1* | 11/2018 | Pelletier | H04W 72/1242 |

FOREIGN PATENT DOCUMENTS

| | | |
|---|---|---|
| CN | 104052581 A | 9/2014 |
| JP | 2012124971 A | 6/2012 |
| JP | 2014504096 A | 2/2014 |
| JP | 2014075819 A | 4/2014 |
| JP | 2014511057 A | 5/2014 |
| WO | 2010148319 A1 | 12/2010 |
| WO | 2015017373 A1 | 2/2015 |
| WO | 2015148001 A1 | 10/2015 |
| WO | 2016048595 A1 | 3/2016 |

OTHER PUBLICATIONS

Nokia, et al., "UCI Transmission on LAA SCells," 3GPP Draft; R1-164920, 3rd Generation Partnership Project (3GPP), Mobile Competence Centre; 650, Route Des Lucioles; F-06921 Sophia-Antipolis Cedex; France, vol. RAN WG2, No. Nanjing, China; May 23, 2016-May 27, 2016, May 13, 2016, XP051090211, Retrieved from the Internet: URL: http://www.3gpp.org/ftp/tsg_ran/WG1_RL1/TSGR1_85/Docs/ [retrieved on May 13, 2016].

* cited by examiner

UPLINK CONTROL INFORMATION REPORTING

CROSS-REFERENCE TO RELATED APPLICATIONS

This application claims the benefit of U.S. Provisional Patent No. 62/340,975, filed May 24, 2016. The content of the provisional application is hereby incorporated by reference in their entirety.

FIELD

Certain aspects of the present disclosure generally relate to wireless communications and, more particularly, to techniques for uplink control information (UCI) reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the present disclosure provide a method of wireless communication by a user equipment. In certain aspects, the method includes receiving an indication of a number of symbols of a subframe available for uplink transmission. The method further includes rate matching uplink control information (UCI) to the subframe based on the indication.

Certain aspects of the present disclosure provide a computer readable medium having instructions stored thereon for performing a method for wireless communication by a user equipment. In certain aspects, the method includes receiving an indication of a number of symbols of a subframe available for uplink transmission. The method further includes rate matching uplink control information (UCI) to the subframe based on the indication.

Certain aspects of the present disclosure a user equipment. In certain aspects, the user equipment comprises a memory and a processor. The processor is configured to receive an indication of a number of symbols of a subframe available for uplink transmission. The processor is configured to rate matching uplink control information (UCI) to the subframe based on the indication.

Certain aspects of the present disclosure provide a user equipment. In certain aspects, the user equipment includes means for receiving an indication of a number of symbols of a subframe available for uplink transmission. The user equipment further includes means for rate matching uplink control information (UCI) to the subframe based on the indication.

Certain aspects of the present disclosure provide a method of wireless communication by a user equipment, the method comprising: mapping uplink control information (UCI) information to all resource blocks of a first interlace prior to mapping UCI to any resource block of a second interlace based on the first interlace comprising a resource block associated with a lower frequency than any of the resource blocks of the second interlace.

Certain aspects of the present disclosure provide a method of wireless communication by a user equipment, the method comprising: receiving an indication of which subframes of a plurality of subframes to transmit uplink control information (UCI); and mapping the UCI to the subframes of the plurality of subframes.

Certain aspects of the present disclosure provide a method of wireless communication by a user equipment, the method comprising: selecting a subframe to transmit uplink control information (UCI); and selecting at least one of a cyclic shift for a reference signal, a sequence for the reference signal, or a value for bits of a fixed location of the selected subframe to indicate transmission of the UCI in the selected subframe.

Certain aspects of the present disclosure provide a method of wireless communication by a user equipment, the method comprising: selecting a beta offset for transmission of uplink control information (UCI) based on at least one of a usable length of a subframe for transmitting the UCI, a number of symbols punctured in the subframe, or a number of partial symbols of the subframe.

Certain aspects of the present disclosure provide a method of wireless communication by a user equipment, the method comprising: receiving an uplink grant comprising information of whether or not to transmit uplink control information (UCI) during an uplink transmission.

Certain aspects of the present disclosure provide a method of wireless communication by a base station, the method comprising: transmitting an indication of a number of symbols of a subframe available for uplink transmission.

Certain aspects of the present disclosure provide a method of wireless communication by a base station, the method comprising: receiving a subframe; and determining if the subframe includes uplink control information (UCI) based on at least one of a cyclic shift for a reference signal of the subframe, a sequence for the reference signal, or a value for bits of a fixed location of the subframe.

Certain aspects of the present disclosure provide a method of wireless communication by a base station, the method comprising: transmitting an indication of which subframes of a plurality of subframes to transmit uplink control information (UCI).

Certain aspects of the present disclosure provide a method of wireless communication by a base station, the method comprising: transmitting an uplink grant comprising information of whether or not to transmit uplink control information (UCI) during an uplink transmission.

Aspects generally include methods, apparatus, systems, computer program products, computer-readable medium, and processing systems, as substantially described herein with reference to and as illustrated by the accompanying drawings. "LTE" refers generally to LTE, LTE-Advanced (LTE-A), LTE in an unlicensed spectrum (LTE-whitespace), etc.

DETAILED DESCRIPTION

Figure 1:
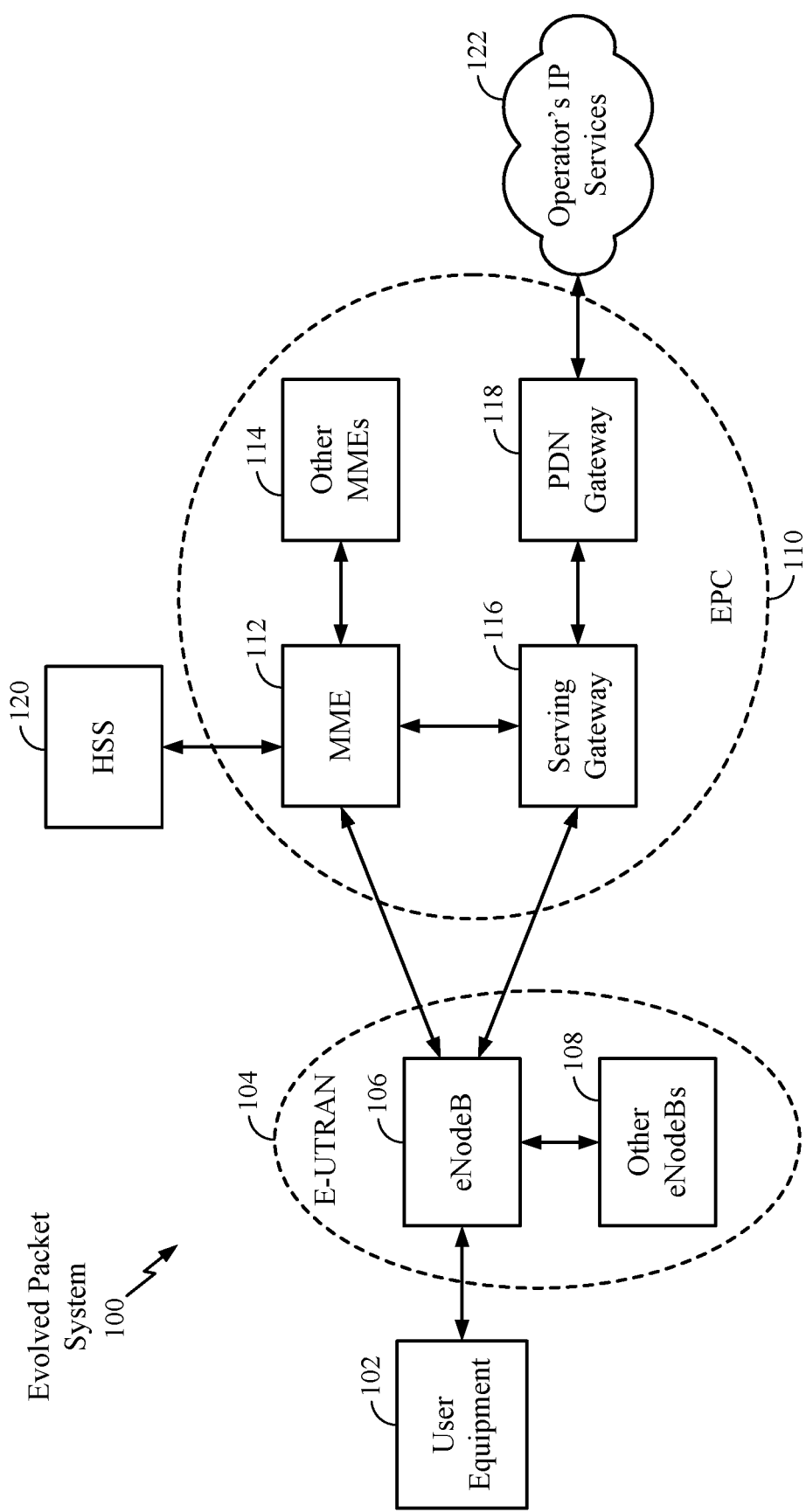
FIG. 1 is a diagram illustrating an example of a network architecture.

According to aspects of the present disclosure, techniques are provided for uplink control information (UCI) reporting. In particular, in certain aspects, techniques are provided to map UCI to different communication resources (time, frequency, etc.) taking into account certain constraints (e.g., interlace design, listen-before-talk (LBT) implementation, etc.). For example, for certain standards (e.g., enhanced license assisted access (eLAA), MuLTEFire, etc.), certain constraints may be considered to make UCI reporting more efficient.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100 in which aspects of the present disclosure may be practiced.

The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

In some examples, the wireless communications network may be a Long Term Evolution (LTE)/LTE-Advanced (LTE-A) network. For example, the network may include an LTE/LTE-A network, a MuLTEFire network, a neutral host small cell network, or the like, operating with overlapping coverage areas. A MuLTEFire network may include access points (APs) and/or base stations communicating in an unlicensed radio frequency spectrum band, e.g., without a licensed frequency anchor carrier. In some instances, the LTE/LTE-A network may include eLAA operation in which at least one carrier operates in an unlicensed radio frequency spectrum band, but with an anchor carrier operating in licensed frequency.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set, an access point, or some other suitable terminology. The eNB 106 may provide an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, a drone, a robot, a sensor, a monitor, a meter, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In certain aspects, one or more UE 102 may be configured to transmit UCI to one or more eNB 106 according to techniques for UCI reporting discussed herein.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions.

The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE102 may be coupled to the PDN through the LTE network.

Figure 2:
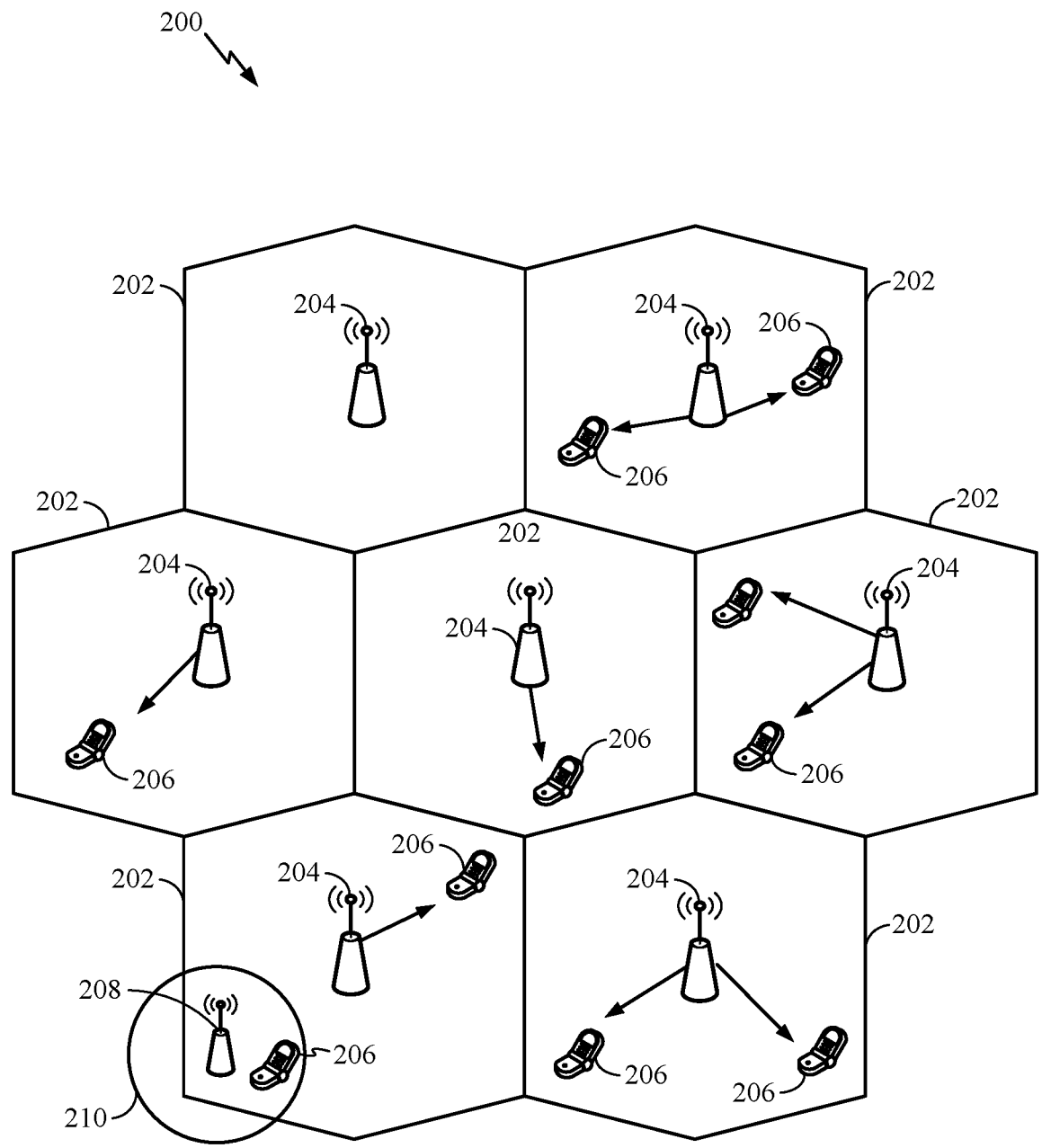
FIG. 2 is a diagram illustrating an example of an access network.

FIG. 2 is a diagram illustrating an example of an access network 200 in an LTE network architecture in which aspects of the present disclosure may be practiced. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. The network 200 may also include one or more relays (not shown). According to one application, a UE may serve as a relay.

In certain aspects, one or more UE 206 may be configured to transmit UCI to one or more eNB 204 or 208 according to techniques for UCI reporting discussed herein.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
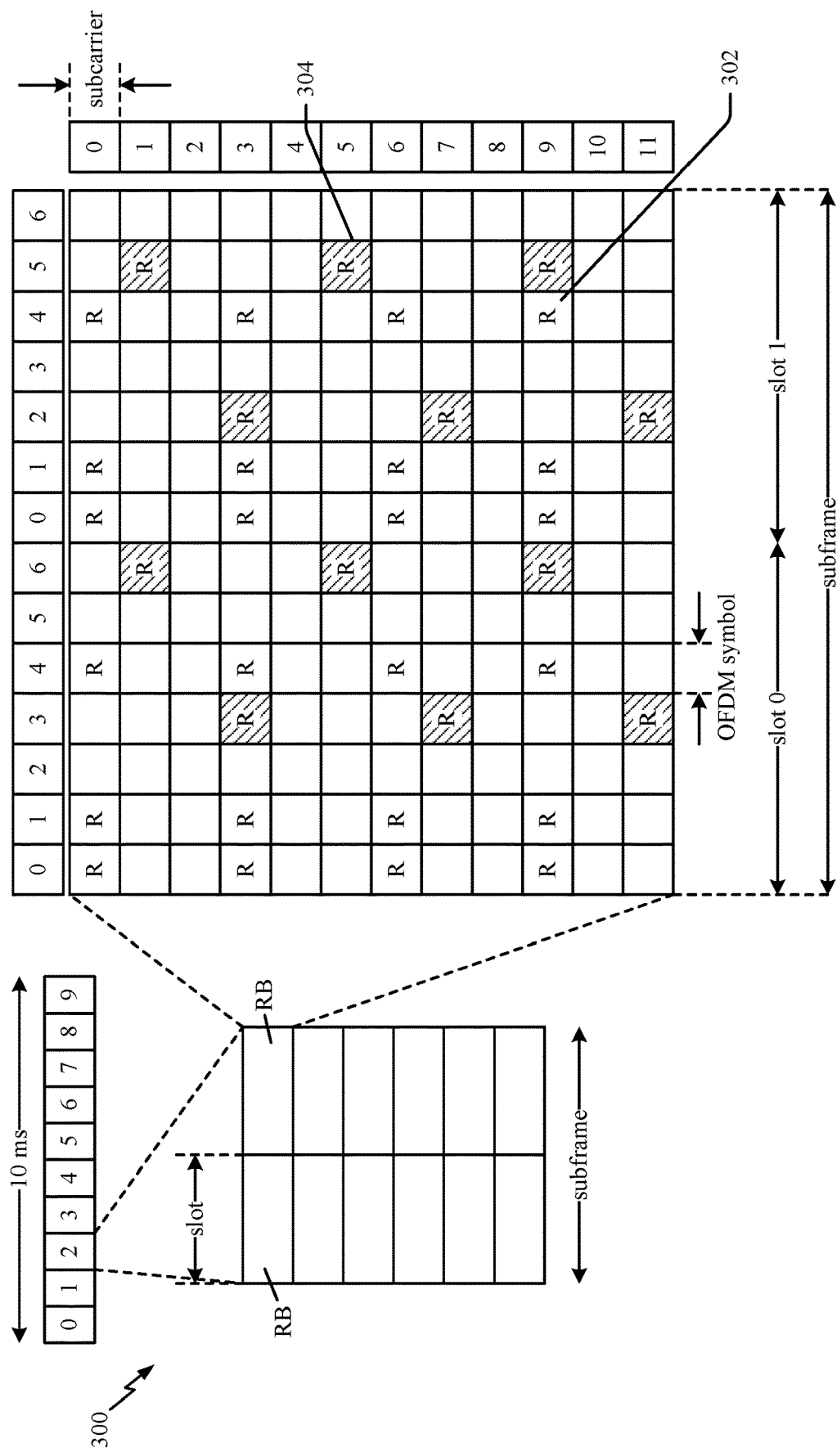
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Since each sub-frame is made up of 2 time slots, and thus 2 resource blocks, each sub-frame includes 14 OFDM symbols. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, in certain aspects, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
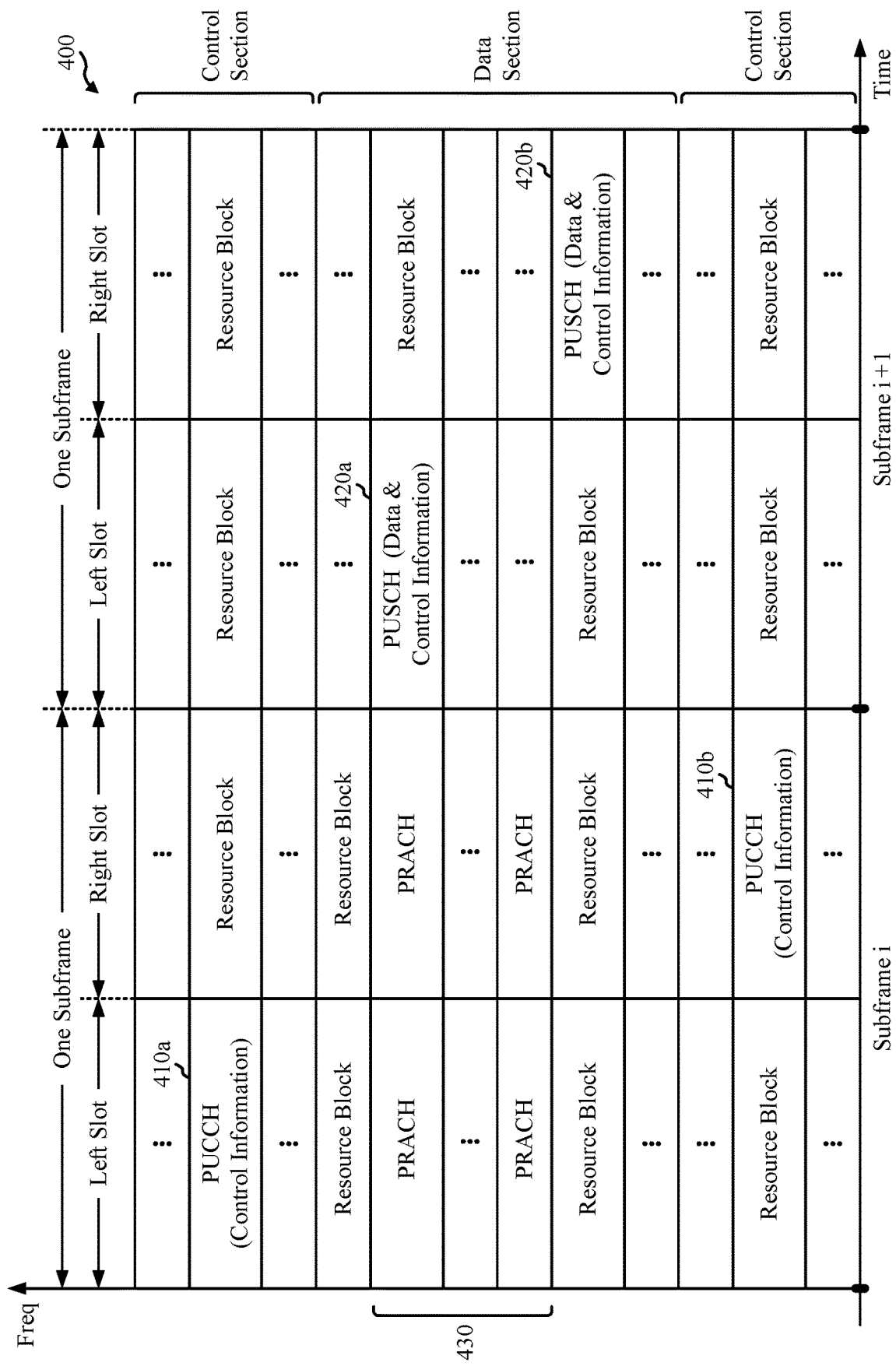
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information, including UCI as discussed herein, in a physical UL control channel (PUCCH) on the assigned resource blocks in the control section. The UE may transmit only data or both data and control information, including UCI as discussed herein, in a physical UL shared channel (PUSCH) on the assigned resource blocks in the data section. In particular, techniques for reporting UCI as discussed herein may be used to transmit UCI on the PUCCH and/or the PUSCH. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
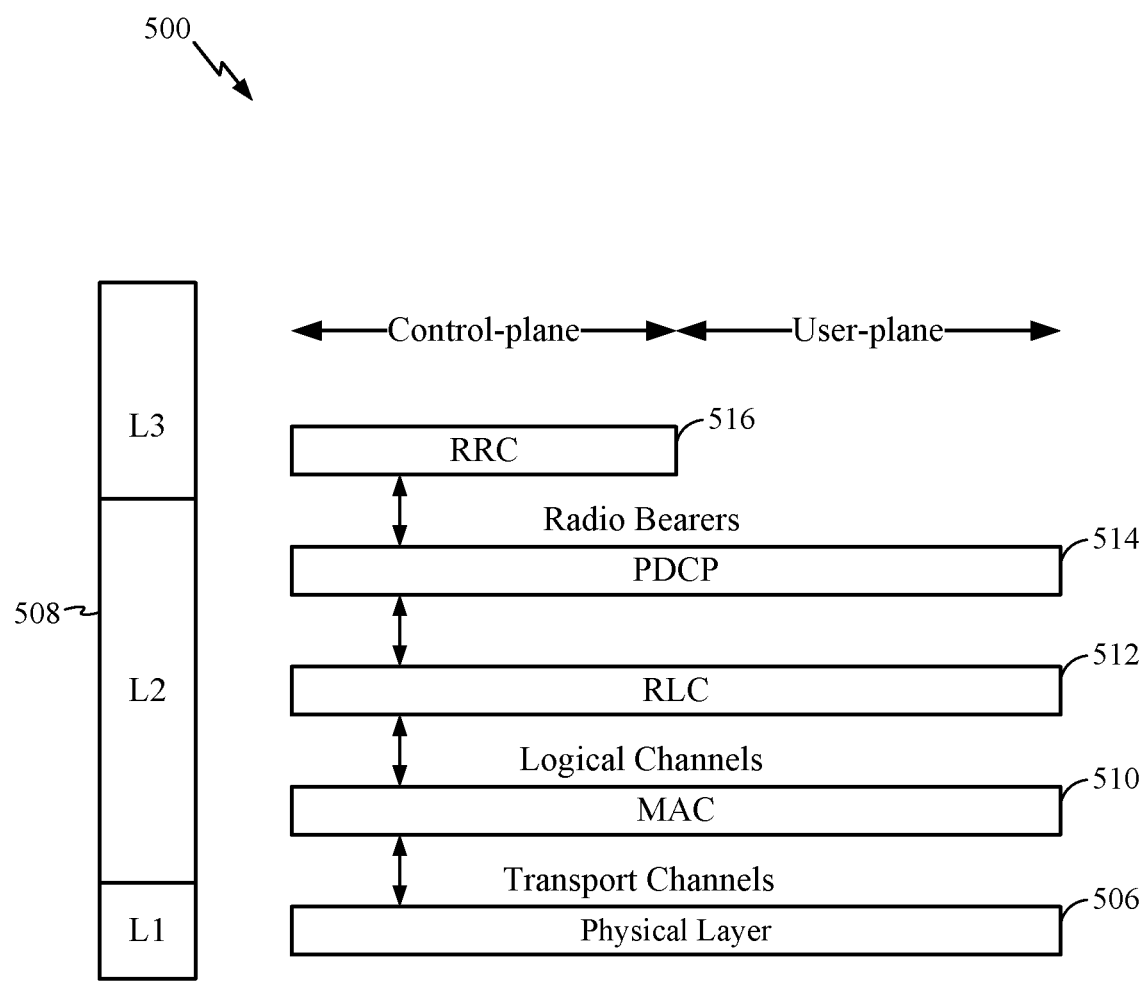
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
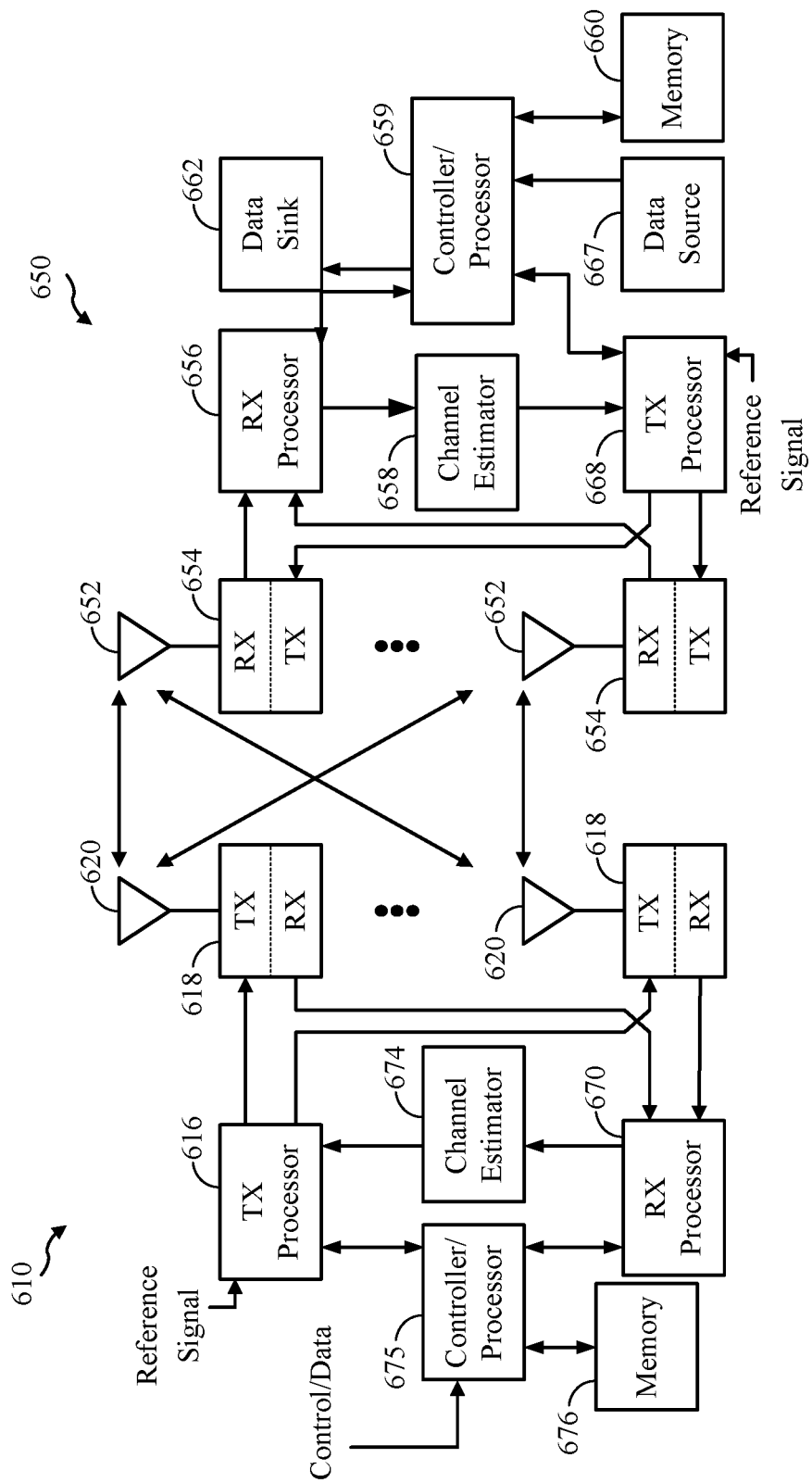
FIG. 6 is a diagram illustrating an example of an evolved Node B and user equipment in an access network, in accordance with certain aspects of the disclosure.

FIG. 6 is a block diagram of an eNB 610 in communication with a UE 650 in an access network, in which aspects of the present disclosure may be practiced.

In certain aspects, UE 650 may be configured to transmit UCI to eNB 610 according to techniques for UCI reporting discussed herein.

In the DL, upper layer packets from the core network are provided to a controller/processor 675. The controller/processor 675 implements the functionality of the L2 layer, for example. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer), for example. The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer, for example. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer, for example. The controller/processor 659 can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659, for example. The data source 667 represents all protocol layers above the L2 layer, for example. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610, for example. The controller/processor 659 is also responsible for HARQ operations, retransmission of lost packets, and signaling to the eNB 610, for example.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer, for example.

The controller/processor 675 implements the L2 layer, for example. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controllers/processors 675, 659 may direct the operations at the eNB 610 and the UE 650, respectively.

The controller/processor 659/675 and/or other processors, components and/or modules at the UE 650/eNB 610 may perform or direct operations, for example operations 800-1400 in FIGS. 8-14, and/or other processes or techniques described herein for UCI reporting. The memories 660 and 676 may store data and program codes for the UE 650 and eNB 610 respectively, accessible and executable by one or more other components of the UE 650 and the eNB 610.

Example Techniques for Uplink Control Information Reporting

In certain aspects, UEs may be configured to transmit uplink control information (UCI) to an eNB (e.g., multiplexed on the PUSCH). Such UCI may include channel quality indicator (CQI), acknowledgement/negative acknowledgement (ACK/NACK), rank indicator (RI), etc. For example, in certain aspects CQI may be mapped to resources on an uplink channel, such as PUSCH, in a different manner than other UCI, such as ACK/NACK and RI. In certain aspects, mapping of UCI to certain RBs may refer to the UCI being multiplexed on such RBs for transmission.

Figure 7:
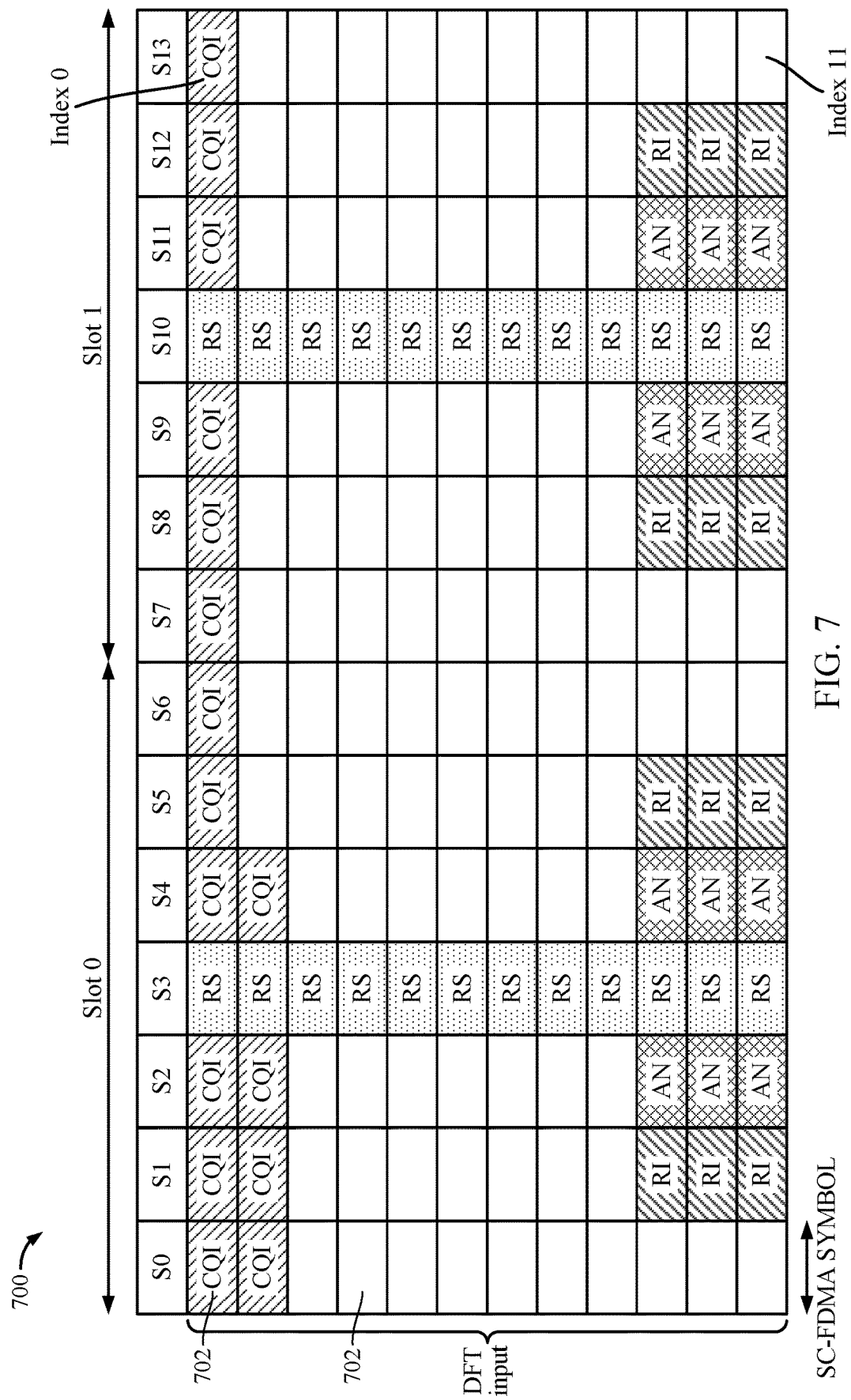
FIG. 7 illustrates an example PUSCH allocation for a subframe, in accordance with certain aspects of the present disclosure.

For example, FIG. 7 illustrates an example PUSCH allocation for a subframe 700. As shown, the subframe 700 includes 2 time slots (slot 0 and slot 1), each including a plurality of RBs 702 allocated for PUSCH. The RBs 702 as illustrated may refer to a logical allocation of RBs for PUSCH, and may be referred to by index, where a lower index refers to a RB at a lower frequency band (e.g., lower tone index) and a higher index refers to a RB at a higher frequency band (e.g., higher tone index). In some aspects, the physical RBs may be allocated contiguously in the frequency domain. In some aspects, the physical RBs may be allocated non-contiguously in the frequency domain. Each time slot includes 7 symbols (as shown, slot 0 includes symbols S0-S6, slot 1 includes symbols S7-S13) in the time domain. Further, in some aspects, the allocation of physical RBs may be different for different subframes and/or slots, or the same for different subframes and/or slots. The number of RBs allocated to PUSCH may be configurable. As shown in FIG. 7, 12 RBs are allocated to PUSCH per symbol.

As shown, in the example subframe 700, CQI may be mapped (e.g., before the discrete Fourier transform (DFT)) to the RBs 702 starting with the lowest index (e.g., 0) in the subframe 700, while other UCI (e.g., ACK/NACK and RI) are mapped to the RBs starting with the highest index (e.g., 11) in the subframe 700. In particular, ACK/NACK (shown in FIG. 7 as "AN") is mapped in symbols (shown as symbols S2, S4, S9, and S11) adjacent to the symbols (shown as symbols S3 and S10) used for a reference signal (RS). Further, RI is mapped in symbols (shown as symbols S1, S5, S8, and S12) adjacent to ACK/NACK. CQI, as shown, may be mapped in each symbol, (e.g., starting from the symbol 0 (S0) and then forward in time) not used for the RS. Further, if the CQI spans more than all the symbols of a first index RB in the subframe, the CQI is mapped to the next index RB (e.g., again starting from the symbol 0 (S0) and then forward in time). Accordingly, mapping CQI from the lowest index to higher indices, and other UCI from the highest index to lower indices, may help ensure that the allocated RBs for CQI and RI/ACK/NACK do not conflict.

In certain aspects, the number of resource elements (REs) of the allocated RBs 702 utilized for transmitting UCI on PUSCH in a subframe is configurable, and the number of REs utilized to transmit CQI, ACK/NACK, and RI may be variable. For example, as discussed with respect to FIG. 3, each RB 702 includes a plurality of REs. In certain aspects, not all of the REs in an allocated RB 702 are utilized for transmitting UCI. In certain aspects, the number of REs utilized for a given RB 702, or across all allocated RBs 702 may be configurable. In certain aspects, if there are not sufficient REs in the allocated RBs 702 to map all of the UCI in the subframe 700, REs of the allocated RBs 702 may need to be punctured. In certain aspects, CQI may have a lower priority, e.g., than ACK/NACK and RI, and therefore REs of RBs 702 used for CQI may be punctured as needed to accommodate the ACK/NACK and RI to be transmitted. Further, in certain aspects, allocation of RBs for other purposes (e.g., allocation of UEs to transmit PUSCH in subsequent UL subframes, use of first symbol for sensing, etc.) may cause REs of RBs 702 used for CQI to be more likely to be used for other purposes. Therefore, certain aspects described further herein relate to techniques for mapping UCI to resources on the PUSCH to enhance transmission of UCI. In the aspects described, each of the eNB and UEs may have sufficient information (e.g., preconfigured data, functions, algorithms, configuration using signaling, etc.) to ensure that they have knowledge of how to map UCI and where to look for UCI in the allocated RBs.

In certain aspects, such as in eLAA, the UE may receive information (e.g., downlink control information (DCI)) on a downlink (e.g., PDCCH) from an eNB. The information may include information regarding UL resource allocation for the UE. For example, the information may indicate whether the first and/or last symbol of a subframe are to be rate matched around for PUSCH mapping (e.g., the first and/or last symbol may be used for sensing and rate matched around or punctured so as not to be used for UCI transmission). Further, in certain aspects, the information may indicate the usable length of a subframe for transmission by the UE (e.g., where partial subframes may be allocated to a UE). For example, the information may indicate a number of symbols to be used for PUSCH transmission, and/or explicitly indicate a number of symbols to be used for CQI transmission.

In such aspects, in the time domain, CQI rate matching may be performed, and CQI may be mapped dynamically based on the indicated number of symbols used for transmission on the PUSCH, and/or explicitly indicated number of symbols to be used for CQI transmission. For example, if the information from the eNB indicates that the first symbol of a subframe is to be used for sensing, the RBs of the first symbol may not be used for CQI transmission, and instead the RBs of other symbols of the subframe may be used. In another example, the RBs utilized for CQI transmissions in a given symbol may be shifted, (e.g., the first two indexed RBs may not be utilized for CQI transmissions, and instead CQI transmission may begin at a later RB index (e.g., the third index RB)) where it avoids the impact of channel sensing and/or Rx to Tx switching on CQI transmission in that symbol. The UE and eNB may have information (e.g., preconfigured algorithm, function, etc.) sufficient to indicate how the mapping of resources for CQI transmission is to occur based on the information indicated to the UE, such that the UE can select the RBs for CQI transmission and the eNB can look for CQI transmissions on the selected RBs.

In certain aspects, slot hopping, where resources in the first slot allocated to a UE in a subframe are on a first set of subcarriers (e.g., RB), and resources in a second slot allocated to a UE in a subframe are on a second set of subcarriers (e.g., RB) different than the first, may provide frequency diversity and interference diversity to improve reception of UCI. However, in certain aspects, such as in eLAA, slot hopping may not be feasible, due to use of an interlace structure. In particular, an interlace allocation may be an allocation of non-contiguous physical RBs in the frequency domain for the UL.

In some such aspects, for a UE, UCI may be mapped onto different RBs at different frequency bands in the first and second slot of a subframe of the PUSCH to take advantage of diversity, for example when a part of a symbol is affected with channel sensing or Rx to Tx switching, even if the PUSCH does not support slot hopping. Further, in some such aspects, the different RBs allocated for UCI in the different slots may belong to the same interlace, or belong to multiple interlaces.

In some aspects, CQI may be mapped to RBs of the lowest indexed interlace allocated for a UE before mapping CQIs to other interlaces. For example, interlace allocations of RBs may be defined by the number of RBs between RBs of a given interlace, and an index of the interlace. In one example, the number of RBs Q between RBs of a given interlace may be 10. Further, the indices of the interlaces q may be 0, 1, 2, ... 9. Accordingly, the interlace at index q, may include RBs q, q+Q, q+2*Q, ... q+Q*(Q-1). In particular, in this example, an interlace at index 0 may include RBs at RB index 0, 10, 20, 30 ..., 90. An interlace at index 1 may include RBs at RB index 1, 11, 21, 31 ..., 91.

Accordingly, if the allocated interlaces for a UE include interlaces with index 0 and index 1, CQI may be mapped to RBs at RB index 0, 10, 20, 30 ..., 90 of the interlace index 0 before mapping to RBs at RB index 1, 11, 21, 31 ..., 91 of the interlace index 1.

In some aspects, the CQI may be mapped onto RBs of the lowest indexed allocated interlaces, among a group of interlaces, with the largest contiguous allocation. For example, if interlace indexes [0, 1, 2, 5, 6, 7, 8] are allocated for PUSCH, the grouping of interlace indexes 5, 6, 7, 8 is a larger contiguous set of allocated RBs than the grouping of interlace indexes 0, 1, 2. Accordingly, the CQI may be mapped onto the RBs of interlace indexes 5, 6, 7, 8 before mapping on to interlace indexes 0, 1, 2, even though interlaces indexes 0, 1, and 2 are of a lower index. Further, the CQI may be mapped to the RBs of interlace index 5, before 6, 7, and 8.

In some aspects, only a fraction/subset of the subcarriers in each RB allocated to a UE may be used for CQI mapping. This may take advantage of the large number of allocated RBs. For example, the number of subcarriers may be configured using radio resource control (RRC) signaling. In another example, the number of subcarriers may be derived as a function of the payload size (e.g., of the CQI) and the number of RBs allocated. Accordingly, CQI mapping may be spread out over the frequency domain rather than just the time domain.

In some aspects, all of the UCI may be multiplexed together, not just CQI, and mapped to resources according to any of the aspects described herein. For example, where UCI includes a cyclic redundancy check (CRC) and/or additional tag for ACK/NACK synchronization between the eNB and the UE, there may not be a need for enhanced protection of other UCI over the CQI.

In some aspects, multiple transmit time interval (multi-TTI) UL grants may be used where multiple UL subframes are scheduled for a UE. Accordingly, in some aspects, the eNB may indicate to the UE which subframes can carry UCI (e.g., the first 2 subframes of the multi-TTI UL grant). For example, the subframes that can carry UCI may be signaled using RRC signaling. In another example, the subframes that can carry UCI may be indicated in DCI.

In some aspects, with respect to the use of multi-TTI UL grants, the eNB may signal to the UE whether the payload (e.g., UCI) carried over multiple subframes is the same payload or an updated payload based on a previously allocated subframe. For example, this may be signaled using RRC signaling.

In some aspects, with respect to the use of multi-TTI UL grants, the UE may autonomously select the subframe to transmit UCI without receiving signaling from the eNB to do so. In some such aspects, the eNB may detect which subframe the UE has chosen for transmitting UCI based on the demodulation reference signal (DMRS) for the subframe. For example, a particular cyclic shift of sequence may be chosen for the DMRS as indicating whether a UCI is present or not in the subframe. In some other such aspects, the UE may indicate information about which subframes include UCI in some fixed bits in a known resource location. In such embodiments, PUSCH may be rate matched around such resources.

In some aspects, UCI may be given a lower code rate than data by a certain number of dBs to ensure different receive quality of UCI compared to data which can benefit from HARQ combining. This offset may be referred to as the beta offset. In some aspects, the beta offset used for UCI transmissions may be based on one or more of: the usable length of the subframe for the UCI, the number of symbols punctured in the subframe for the UCI, and the number of symbols that are partial symbols in the subframe of the UCI. For example, if the UCI is transmitted on the subframes where the usable transmission length is a full TTI, one beta offset may be used. In another example, if the UCI is transmitted on the subframes where the first symbol is partially used for clear channel assessment (CCA), another beta offset may be used. Accordingly, the beta offset may be adjusted such that a higher beta offset is used if it is assumed that certain subcarriers of a symbol may be lost to other purposes to better protect the UCI.

In some aspects, the eNB may grant UL transmission in a LBT frame by sending the corresponding UL grant to the UE in a previous LBT frame. In some aspects, the grant that initiates transmission by the UE may contain information as to whether UCI should be transmitted in the UL transmission. In some aspects, the grant may contain information as to which UCI information (e.g., CQI, ACK/NACK, RI, etc.) should be transmitted in the UL transmission.

In some aspects, UCI may not be transmitted on PUSCH, but instead may be transmitted on PUCCH. For example, in certain aspects, the interlace indexes allocated for PUCCH transmission may be used to carry UCI information. In certain aspects, the assignment of resources on the PUCCH for carrying UCI information may be done according to any of the aspects described with respect to PUSCH. However, in certain aspects, the information may still be encoded using PUCCH encoding.

Figure 8:
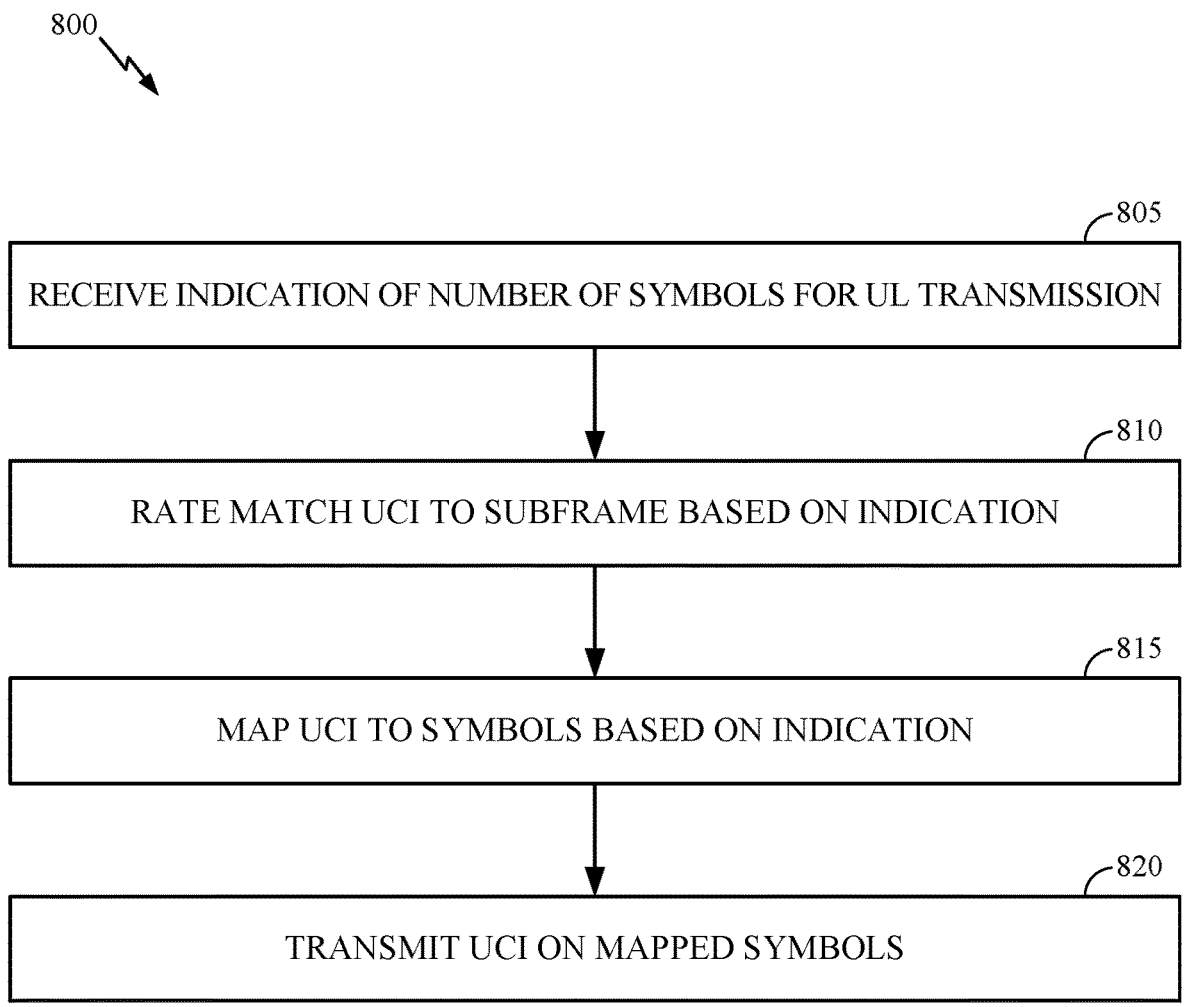
FIG. 8 illustrates example operations for reporting UCI that may be performed by a UE, in accordance with certain aspects of the present disclosure.

FIG. 8 illustrates example operations for reporting UCI that may be performed by a UE, in accordance with certain aspects of the present disclosure. At 805, the UE receives from the eNB (which transmits to the UE) an indication of a number of symbols of a subframe available for uplink transmission. At 810, the UE rate matches uplink control information (UCI) to the subframe based on the indication. At 815, the UE maps the UCI to symbols of the subframe based on the indication. At 820, the UE transmits the UCI on the symbols.

Figure 9:
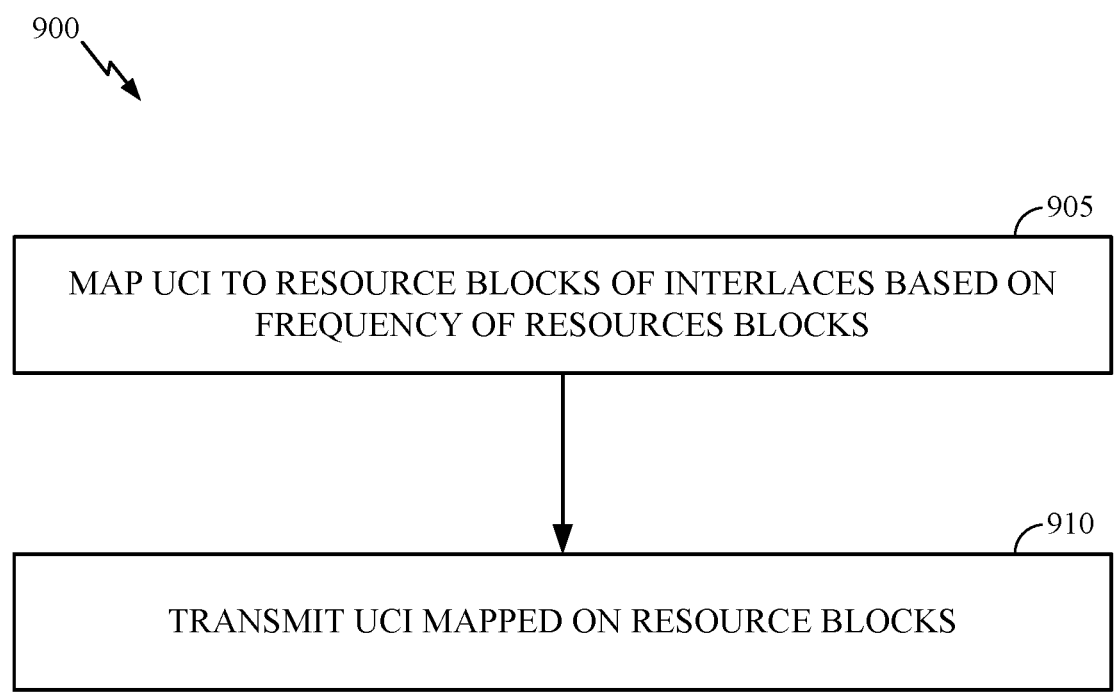
FIG. 9 illustrates example operations for reporting UCI that may be performed by a UE, in accordance with certain aspects of the present disclosure.

FIG. 9 illustrates example operations for reporting UCI that may be performed by a UE, in accordance with certain aspects of the present disclosure.

At 905, the UE maps uplink control information (UCI) information to all resource blocks of a first interlace prior to mapping UCI to any resource block of a second interlace based on the first interlace comprising a resource block associated with a lower frequency than any of the resource blocks of the second interlace. At 910, the UE transmits the UCI on mapped resource blocks.

Figure 10:
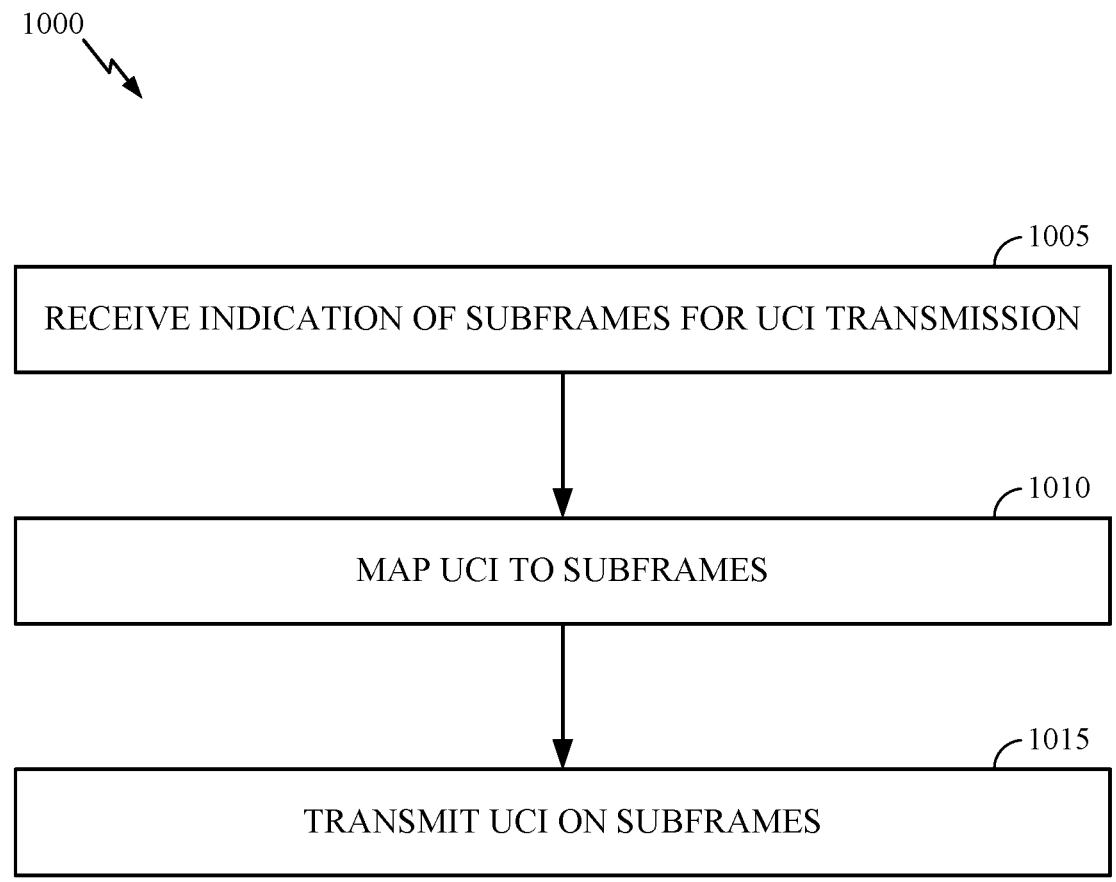
FIG. 10 illustrates example operations for reporting UCI that may be performed by a UE, in accordance with certain aspects of the present disclosure.

FIG. 10 illustrates example operations for reporting UCI that may be performed by a UE, in accordance with certain aspects of the present disclosure.

At 1005, the UE receives from an eNB (which transmits to the UE) an indication of which subframes of a plurality of subframes to transmit uplink control information (UCI). At 1010, the UE maps the UCI to the subframes of the plurality of subframes. At 1015, the UE transmits the UCI on the subframes.

Figure 11:
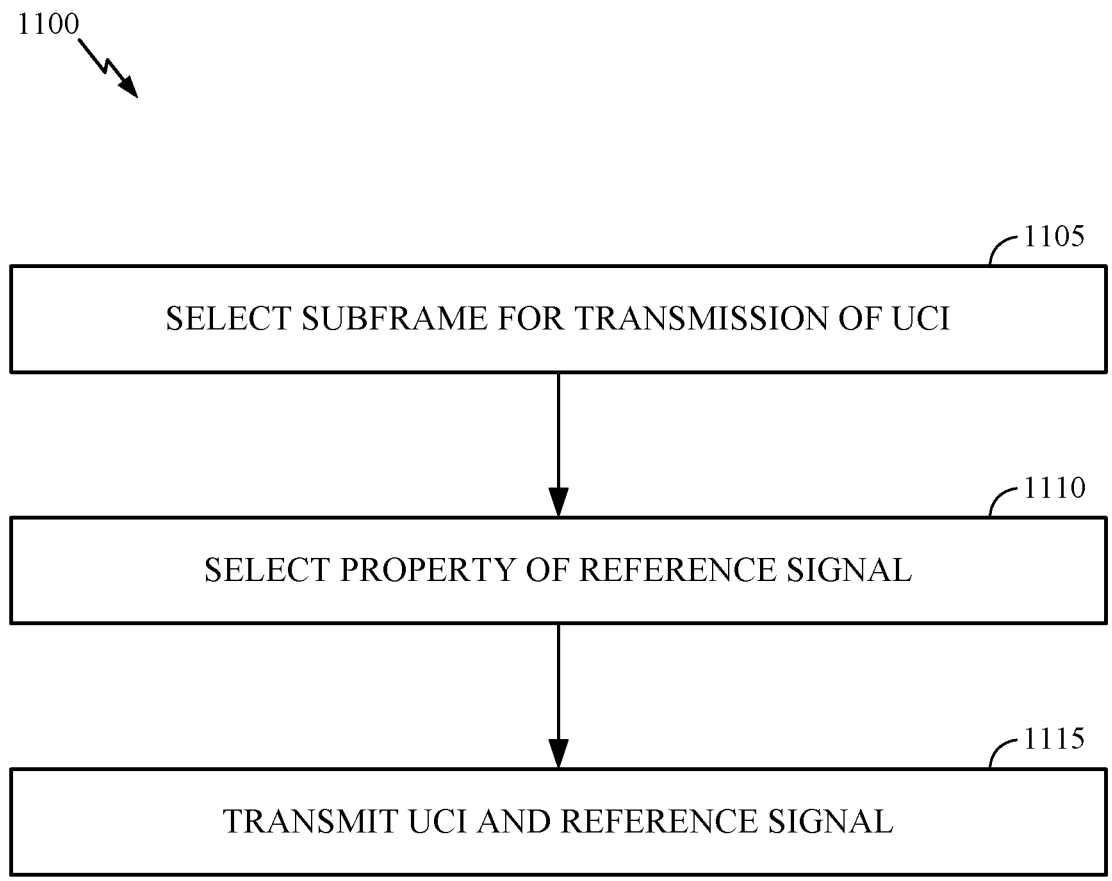
FIG. 11 illustrates example operations for reporting UCI that may be performed by a UE, in accordance with certain aspects of the present disclosure.

FIG. 11 illustrates example operations for reporting UCI that may be performed by a UE, in accordance with certain aspects of the present disclosure.

At 1105, the UE selects a subframe to transmit uplink control information (UCI). At 1110, the UE selects at least one of a cyclic shift for a reference signal, a sequence for the reference signal, or a value for bits of a fixed location of the selected subframe to indicate transmission of the UCI in the selected subframe. At 1115, the UE transmits UCI and the reference signal on the selected subframe.

Figure 12:
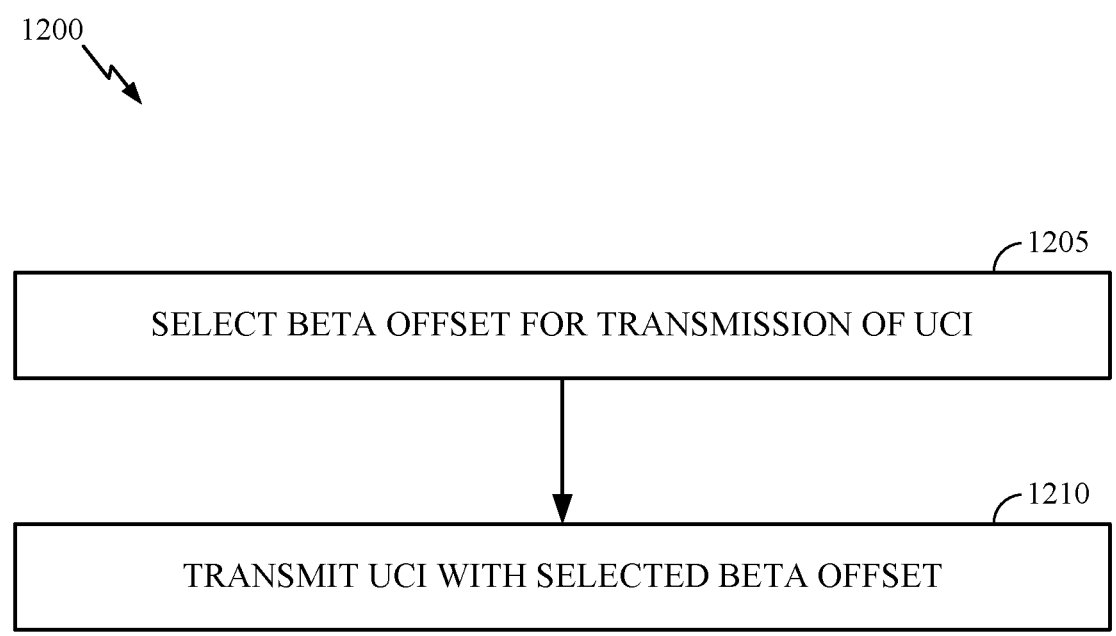
FIG. 12 illustrates example operations for reporting UCI that may be performed by a UE, in accordance with certain aspects of the present disclosure.

FIG. 12 illustrates example operations for reporting UCI that may be performed by a UE, in accordance with certain aspects of the present disclosure.

At 1205, the UE selects a beta offset for transmission of uplink control information (UCI) based on at least one of a usable length of a subframe for transmitting the UCI, a number of symbols punctured in the subframe, or a number of partial symbols of the subframe. At 1210, the UE transmits the UCI with the selected beta offset in the subframe.

Figure 13:
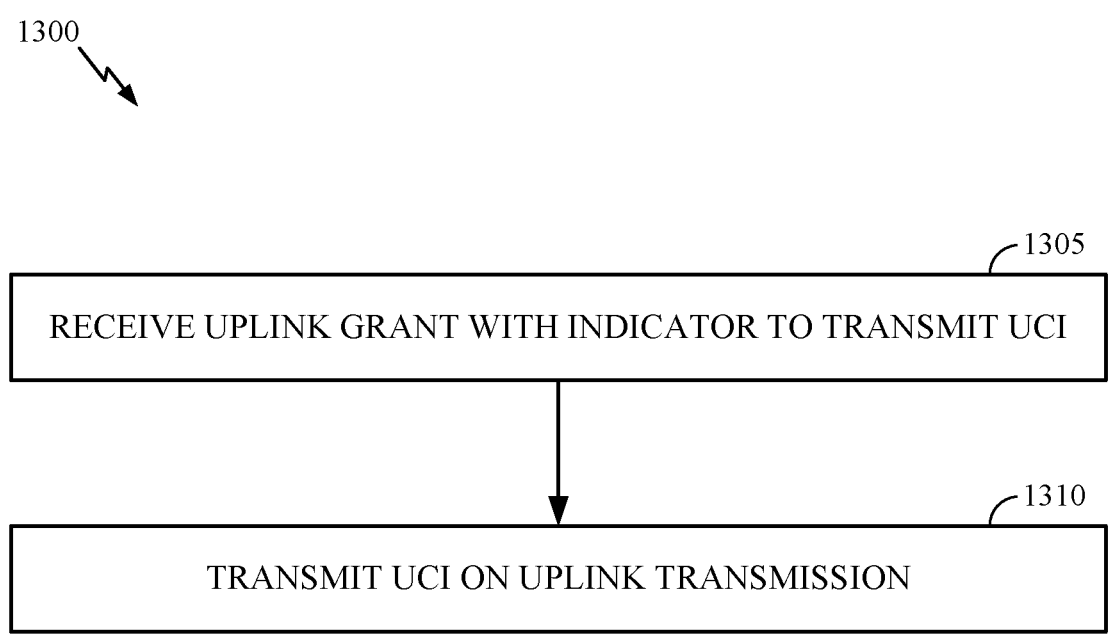
FIG. 13 illustrates example operations for reporting UCI that may be performed by a UE, in accordance with certain aspects of the present disclosure.

FIG. 13 illustrates example operations for reporting UCI that may be performed by a UE, in accordance with certain aspects of the present disclosure.

At 1305, the UE receives, from an eNB (which transmits to the UE), a UL grant comprising information of whether or not to transmit uplink control information (UCI) in a UL transmission corresponding to the UL grant. At 1310, the UE selectively transmits UCI in the UL transmission based on the information.

Figure 14:
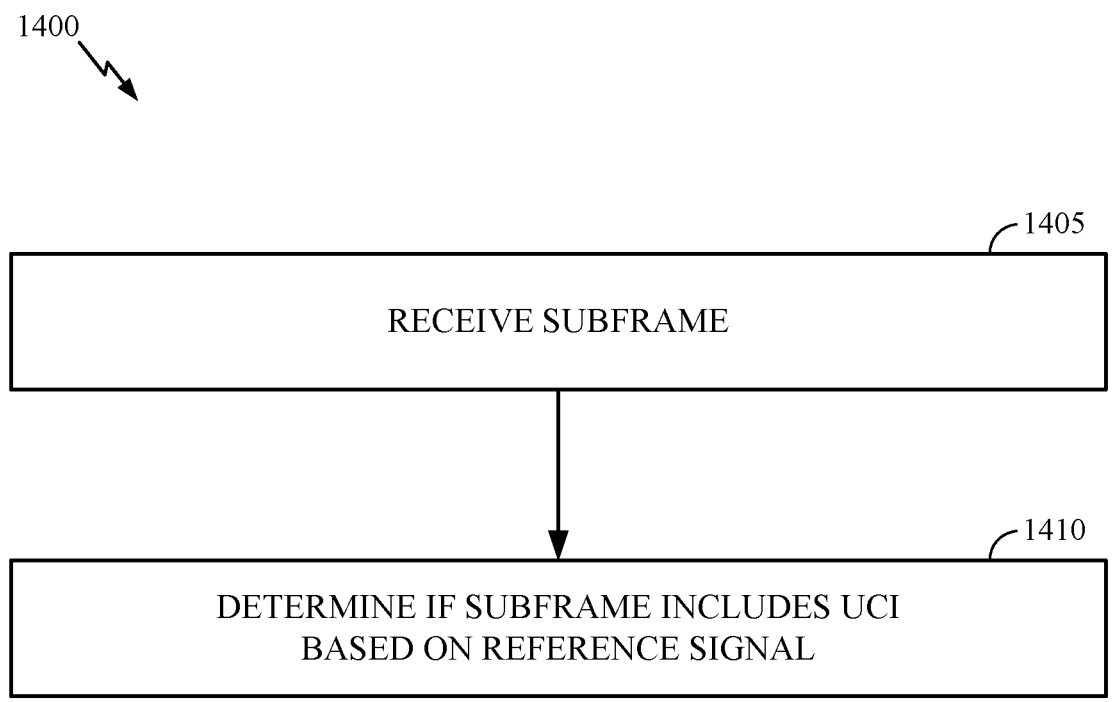
FIG. 14 illustrates example operations for reporting UCI that may be performed by an eNB, in accordance with certain aspects of the present disclosure.

FIG. 14 illustrates example operations for reporting UCI that may be performed by a eNB, in accordance with certain aspects of the present disclosure At 1405, the eNB receives a subframe. At 1410, the eNB determines if the subframe includes uplink control information (UCI) based on at least one of a cyclic shift for a reference signal of the subframe, a sequence for the reference signal, or a value for bits of a fixed location of the subframe.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication by a user equipment, the method comprising:
   receiving, from a base station (BS), an explicit indication of a usable length of a subframe available for uplink transmission, wherein the indication explicitly indicates a partial subframe, of the subframe, available for physical uplink shared channel transmission, wherein the partial subframe comprises a plurality of symbols of the subframe, and wherein at least two symbols of the subframe are to be rate matched around for physical uplink shared channel mapping and not used for uplink control information (UCI) transmission;
   rate matching UCI to the subframe based on the partial subframe available for physical uplink shared channel transmission; and
   transmitting the UCI in a physical uplink shared channel transmission in the subframe on the plurality of symbols.

2. The method of claim 1, further comprising mapping the UCI to the plurality of symbols based on the indication.

3. The method of claim 1, further comprising:
   mapping the UCI to a first frequency band in a first slot of the subframe; and
   mapping the UCI to a second frequency band in a second slot of the subframe.

4. The method of claim 3, wherein the first frequency band and the second frequency band belong to different interlaces.

5. The method of claim 1, further comprising:
   mapping the UCI to all resource blocks of a first interlace prior to mapping the UCI to any resource block of a second interlace based on the first interlace comprising a resource block associated with a lower frequency than any of the resource blocks of the second interlace.

6. The method of claim 5, further comprising mapping the UCI to all resource blocks of the first interlace and the second interlace prior to mapping UCI to any resource block of a third interlace based on the first interlace and the second interlace belonging to a first group of interlaces and the third interlace belonging to a second group of interlaces, wherein the first group of interlaces comprises a greater number of interlaces of consecutive allocation in frequency than the second group of interlaces.

7. The method of claim 5, further comprising mapping UCI to a subset of carriers of the resource blocks of the first interlace.

8. The method of claim 5, further comprising:
   receiving an indication of which subframes of a plurality of subframes to transmit the UCI; and
   mapping the UCI to the subframes of the plurality of subframes.

9. The method of claim 8, wherein the indication of which subframes is received at least one of using radio resource control (RRC) signaling or in a downlink control information.

10. The method of claim 5, further comprising:
    selecting the subframe to transmit the UCI; and
    selecting at least one of a cyclic shift for a reference signal, a sequence for the reference signal, or a value for bits of a fixed location of the subframe to indicate transmission of the UCI in the subframe.

11. The method of claim 5, further comprising:
    selecting a beta offset for transmission of the UCI based on at least one of the usable length of the subframe for transmitting the UCI, a number of punctured symbols in the subframe, or a number of partial symbols of the subframe.

12. The method of claim 5, further comprising:
    receiving an uplink grant comprising information of whether or not to transmit the UCI during an uplink transmission.

13. The method of claim 5, wherein the UCI comprises one or more of a channel quality indicator (CQI), an acknowledgement (ACK), a negative acknowledgement (NACK), or a rank indicator (RI).

14. A user equipment comprising:
    a memory; and
    a processor coupled to the memory, the processor being configured to:
        receive, from a base station (BS), an explicit indication of a usable length of a subframe available for uplink transmission, wherein the indication explicitly indicates a partial subframe, of the subframe, available for physical uplink shared channel transmission, wherein the partial subframe comprises a plurality of symbols of the subframe, and wherein at least two symbols of the subframe are to be rate matched around for physical uplink shared channel mapping and not used for uplink control information (UCI) transmission;
        rate match UCI to the subframe based on the partial subframe available for physical uplink shared channel transmission; and
        transmit the UCI in a physical uplink shared channel transmission in the subframe on the plurality of symbols.

15. The user equipment of claim 14, wherein the processor is further configured to map the UCI to the plurality of symbols based on the indication.

16. The user equipment of claim 14, wherein the processor is further configured to:
map the UCI to a first frequency band in a first slot of the subframe; and
map the UCI to a second frequency band in a second slot of the subframe.

17. The user equipment of claim 16, wherein the first frequency band and the second frequency band belong to different interlaces.

18. The user equipment of claim 14, wherein the processor is further configured to:
map the UCI to all resource blocks of a first interlace prior to mapping the UCI to any resource block of a second interlace based on the first interlace comprising a resource block associated with a lower frequency than any of the resource blocks of the second interlace.

19. The user equipment of claim 18, wherein the processor is further configured to
map the UCI to all resource blocks of the first interlace and the second interlace prior to mapping UCI to any resource block of a third interlace based on the first interlace and the second interlace belonging to a first group of interlaces and the third interlace belonging to a second group of interlaces, wherein the first group of interlaces comprises a greater number of interlaces of consecutive allocation in frequency than the second group of interlaces.

20. The user equipment of claim 18, wherein the processor is further configured to map UCI to a subset of carriers of the resource blocks of the first interlace.

21. The user equipment of claim 14, wherein the processor is further configured to:
receive an indication of which subframes of a plurality of subframes to transmit the UCI; and
mapping the UCI to the subframes of the plurality of subframes.

22. The user equipment of claim 21, wherein the indication of which subframes is received at least one of using radio resource control (RRC) signaling or in a downlink control information.

23. The user equipment of claim 14, wherein the processor is further configured to:
select the subframe to transmit the UCI; and
select at least one of a cyclic shift for a reference signal, a sequence for the reference signal, or a value for bits of a fixed location of the subframe to indicate transmission of the UCI in the subframe.

24. The user equipment of claim 14, wherein the processor is further configured to:
select a beta offset for transmission of the UCI based on at least one of the usable length of the subframe for transmitting the UCI, a number of punctured symbols in the subframe, or a number of partial symbols of the subframe.

25. The user equipment of claim 14, wherein the processor is further configured to:
receive an uplink grant comprising information of whether or not to transmit the UCI during an uplink transmission.

26. A user equipment comprising:
means for receiving, from a base station (BS), an explicit indication of a usable length of a subframe available for uplink transmission, wherein the indication explicitly indicates a partial subframe, of the subframe, available for physical uplink shared channel transmission, wherein the partial subframe comprises a plurality of symbols of the subframe, and wherein at least two symbols of the subframe are to be rate matched around for physical uplink shared channel mapping and not used for uplink control information (UCI) transmission;
means for rate matching UCI to the subframe based on the partial subframe available for physical uplink shared channel transmission; and
means for transmitting the UCI in a physical uplink shared channel transmission in the subframe on the plurality of symbols.

27. A non-transitory computer readable medium having instructions stored thereon for performing a method for wireless communication by a user equipment, the method comprising:
receiving, from a base station (BS), an explicit indication of a usable length of a subframe available for uplink transmission, wherein the indication explicitly indicates a partial subframe, of the subframe, available for physical uplink shared channel transmission, wherein the partial subframe comprises a plurality of symbols of the subframe, and wherein at least two symbols of the subframe are to be rate matched around for physical uplink shared channel mapping and not used for uplink control information (UCI) transmission;
rate matching UCI to the subframe based on the partial subframe available for physical uplink shared channel transmission; and
transmitting the UCI in a physical uplink shared channel transmission in the subframe on the plurality of symbols.

* * * * *